United States Patent

[11] 3,557,957

| [72] | Inventor | Jesse A. Baldwin<br>Kearney, Nebr. |
|---|---|---|
| [21] | Appl. No. | 733,710 |
| [22] | Filed | May 31, 1968 |
| [45] | Patented | Jan. 26, 1971 |
| [73] | Assignee | J.A. Baldwin Manufacturing Company<br>Kearney, Nebr.<br>a corporation of Wisconsin. |

[54] FILTER ASSEMBLY HAVING A TWO-WAY BYPASS VALVE THEREIN
5 Claims, 3 Drawing Figs.

[52] U.S. Cl. .................................................. 210/130,
210/440, 210/443
[51] Int. Cl. ......................................................... B01d 35/14,
B01d 27/10
[50] Field of Search .......................................... 210/130,
132, 440, 443

[56] References Cited
UNITED STATES PATENTS

| 3,262,564 | 7/1966 | Pall et al. ..................... | 210/132X |
| 3,262,567 | 7/1966 | Pall et al. ..................... | 210/130 |
| 3,456,800 | 7/1969 | Humbert, Jr. ................ | 210/130 |

*Primary Examiner*—Frank A. Spear, Jr.
*Attorney*—J. Harold Kilcoyne

ABSTRACT: A two-way bypass valve unit for incorporation into the lower-end of the so-called center tube of a lubricating oil filter element which, by providing either inside-to-outside or outside-to-inside oil bypass flow through the filter makes it immaterial which of the head passages providing for oil flow to and from the filter serves as the oil inlet passage and which as the oil outflow passage.

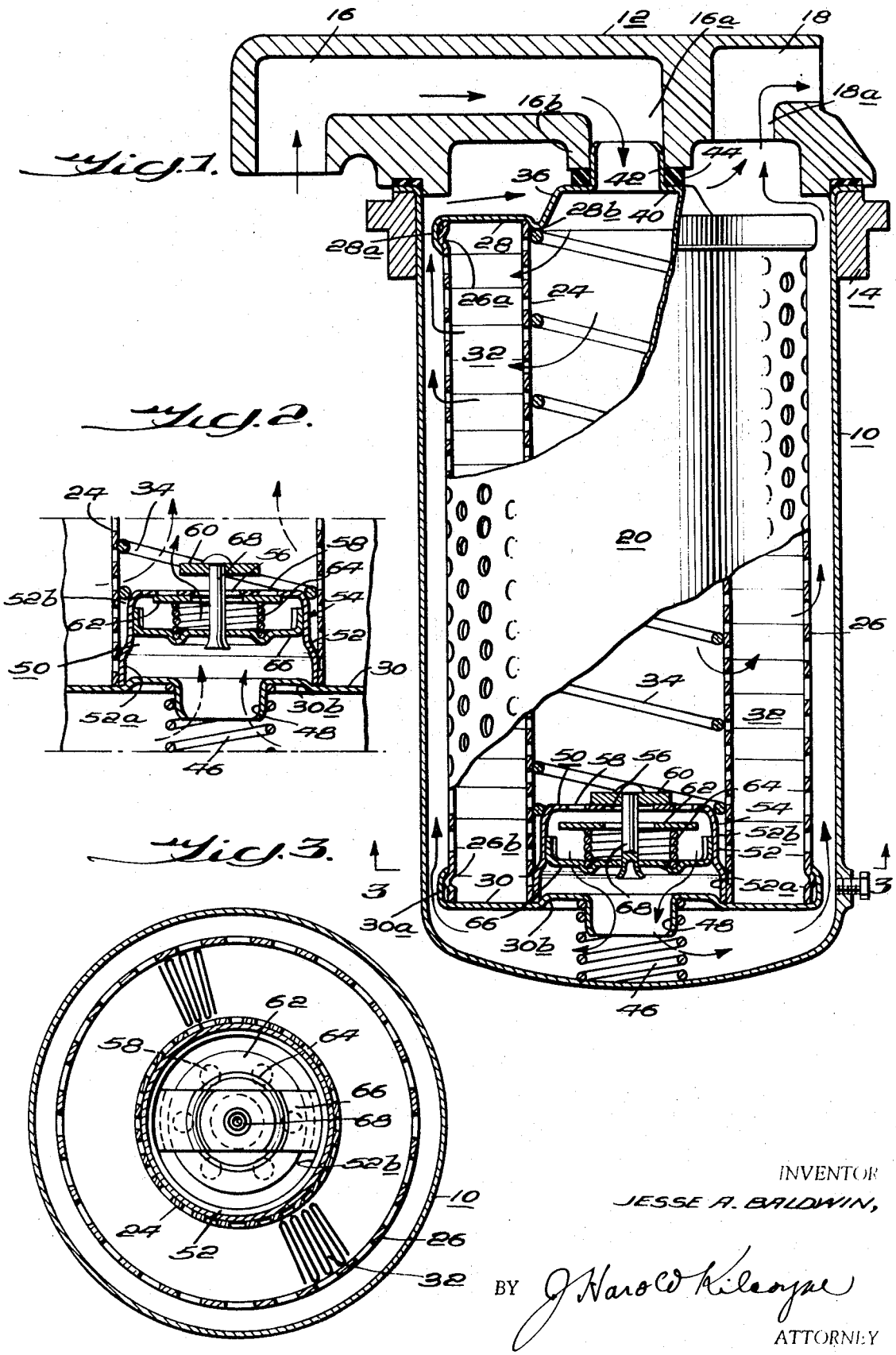

FILTER ASSEMBLY HAVING A TWO-WAY BYPASS VALVE THEREIN

This invention relates to improvements in oil filters, and more particularly in so-called full-flow filters of the type which are adapted to be hooked into the lubricating oil lines of internal combustion engines and are designed to filter out impurities from the oil going to the engine bearings.

As previously constructed, oil filters of the aforesaid type suffered from the disadvantage that the oil entering the filter could bypass the filter element thereof, upon the latter becoming contaminated, in one direction only. In practical effect such resulted in the filter being either an inside out flow filter or an outside in flow filter, but not both. Thus, if the oil line connections should be improperly made and the filter element became plugged, it was likely to burst under the high pressure which develops within the filter bowl and becomes effective against said element under such an operating condition.

One attempt to overcome this disadvantage took the form of a conversion kit designed to make it possible to reverse the direction of bypass flow between the inlet and outlet connections to and from the filter housing as needed. However, it was found that a high percentage of the lubricating oil filters in use were so constructed that their outlet and inlet connections could not be effectively interchanged. For other filters in use which were designed for inside-to-outside flow, the conversion kit did not solve the problem, because such required outside-to-inside flow, thus making it necessary physically to reverse the inlet and outlet connection to and from the oil lines. But this requirement was in many instances disregarded or overlooked completely by the mechanic called upon to install the conversion kit, with the result that bursting of the filter element was not uncommon.

With the above as background, a major object of the present invention is the provision of a practical and thoroughly dependable two-way bypass filter adapted to be connected into the lubricating oil line of an automobile engine which, by permitting oil to bypass in either inside-out or outside-in direction, solves the problem of the filter being incorrectly hooked into the oil line which it serves.

Another important object of the invention is the provision of an oil filter element designed and operative to permit oil to flow therethrough in either direction, and which is so constructed and arranged that it may be employed either in new oil filter construction or sold for use as a replacement filter element for installation in existing filters designed for either, but not both, outside-to-inside flow or inside-to-outside oil flow.

Another important object of the invention is the provision of a two-way bypass valve unit designed to be incorporated into the filter element of a lubricating oil filter and which is so constructed and arranged as to permit oil to flow in either direction through the filter element, which operates in fully automatic manner, which is of simple and practical construction, and which is thoroughly dependable in use.

The above and other objects and features of advantage are effectively accomplished by the filter, filter element and/or two-way bypass valve unit as incorporated in said element which will now be described in detail and which are illustrated in the accompanying drawing depicting same, wherein:

FIG. 1 is a broken-away, part-sectional side elevation of a two-direction bypass oil filter according to the present invention hooked into a lubricating oil line in manner as to provide inside-to-outside oil flow therethrough and with the bypass valve unit also operating to provide oil flow in similar direction;

FIG. 2 is a fragmentary sectional view of the two-way flow valve shown in z1 1, but with the bypass valve operating to provide outside-to-inside flow through the filter element; and FIG. 3 is a section taken along line 3-3 of FIG. 1.

Referring to the drawing in detail, reference numeral 10 designates the bowl, reference numeral 12 the head casting, and reference numeral 14 the clamp ring or fitting to which said head is bolted (by means not shown) of a conventional Nugent filter currently widely used on Cummins engines, and which is to be taken as illustrative of either a new or existing filter bowl and head assembly in which the improved two-way flow filter element of the invention may be employed. It will be noted that said bowl head 12 is formed with oil-flow passages 16 and 18 through which oil to be filtered is flowed into and from the filter bowl, of which passage 16 terminates at its inner end in an axially disposed passage portion 16a opening into the interior of the bowl and the passage 18 communicates with the bowl interior through passage portion 18a which is disposed outwardly from the bowl axis.

Reference numeral 20 generally indicates a filter element incorporating a two-way bypass valve unit generally indicated at 50, with which latter, alone and in combination with said element, the invention is particularly concerned, and which is designed to permit either inside-out bypass flow or outside in bypass flow around the filter element, as makes it immaterial which of the passages 16 and 18 operates as the oil inlet passage and conversely, which operates as the oil outlet passage.

As best seen in FIG. 1, said filter element 20 comprises an inner tubular perforated metal screen 24 (hereinafter for convenience termed the center tube) and an outer screen 26 respectively which are secured together by end caps 28 and 30. Contained in the annular space between said center tube and outer screen is a pleated paper filter element 32 whose opposite end edges are sealed to the inner surface of the end caps by a suitable adhesive which is applied to the end edges of every pleat prior to assembly of said end caps therewith. Preferably, the end caps are secured to the end edges of the outer screen 26 by clinching the edges of the peripheral flanges 28a, 30a provided on said caps over outwardly projecting annular beads 26a, 26b rolled into the end edge portions of said screen. Preferably also, the center tube 24 is located and stiffened by virtue of its opposite ends engaging against outwardly directed shoulders 28b, 30b formed as by depressing annular beads into the bodies of said end caps. Additional center-tube stiffening is provided by a stiff coil spring 34 which extends axially through the bore thereof.

FIG. 1 also shows that the upper end cap 28 is preferably formed inwardly of its said annular bead with a frustoconical portion 36 which merges into an annular flat step 40 from which extends a nipple 42 of diameter as to be snugly received in the aforesaid passage portion 16a through which the head passage 16 communicates with the filter bowl interior. A gasket 44 interposed between the aforesaid end cap step 40 and the opposed end face of a head formation 16b extending about said passages portion 16a provides an effective oil seal between the filter element 20 and the head casting 12, when said filter element is biased axially upwardly with sufficient force as to compress said gasket.

Such upward bias may be simply provided by a coil spring 46 reactive between the closed bottom of the bowl 10 and the lower end cap 30 of the filter element, the spring having such length that it is compressed to an appreciable amount in the assembly of the filter element within the bowl 10 and its head 12. To center said spring 46, the end cap 30 is provided in its central portion with a downwardly extending open ended nipple 48 which terminates short of the bowl bottom. Thus, in addition to its spring-centering function, the nipple also provides an oil-flow passage to and from the bowl interior from and to the center tube 24 of the filter element as will be hereinafter fully discussed.

Now considering the aforesaid two-way flow valve unit 50 of the invention, it is intended that such will be fabricated as a self-contained unit ready for assembly as such in the lower end of the center tube 24, preferably by being press fitted thereinto. More particularly, said valve unit comprises an inverted cup-shaped sheet-metal shell 52 constituting a cylindrical valve body having stepped diameter portions, of which the larger-diameter lower-end portion 52a is slightly oversize with respect to the inside diameter of said center tube 24, as enables the shell body to be bodily press fitted to said tube, and its smaller diameter upper end portion 52b has smaller diameter than that of said center tube, thereby providing an annular flow passage designated 54.

The bottom wall of said inverted cup-shaped shell 52 is provided with a central opening 56 and with a circular series of smaller-diameter openings 58 disposed on a circle concentric with and having diameter substantially greater than that of the central opening 56. A valve assembly for controlling oil flow through said openings comprises a disc valve 60 of diameter somewhat greater than that of the central opening 56 and being adapted to seat flush against the upper face of said shell bottom wall, and a valve annulus 62 adapted to seat flush against the under face of said bottom wall and having outer- and inner-edge diameter such as to be capable of closing the openings 58 of the circular series thereof when so seated.

According to the invention, said disc valve 60 and said valve annulus 62 are biased to their respective seated positions aforesaid by a compression coil spring 64 which is interposed between and thus reactive against the under face of the valve annulus 62 and the upper face of a cross strap 66, the latter extending diameter wise across the shell and having slide fit on the inside surface of the smaller-diameter wall of the upper end portion 52b thereof. Preferably, said cross strap is provided at its ends with upwardly bent flanges extending along arcs of a circle which is slightly smaller than the circle of said upper-end shell portion 52b, the flanges thus functioning as wear shoes.

As will be seen from an analysis of FIGS. 1 and 2, the valve disc 60 and the strap member 66 are nonfixedly connected one to the other and in spaced relation by a rivetlike pin 68 which extends axially through said valves 60, 62 and cross strap 66 and whose head engages against the upper face of the valve disc 60 and whose peened-over lower end engages against the under face of the strap member 66. By this arrangement, and assuming proper length of pin 68 in relation to length and characteristics of the coil spring 64, said compression spring normally biases the cross strap member 66 and hence the valve disc 60 in downward direction. Responsive to such bias, the valve disc 60 is pulled downwardly against its seat and thus normally closes the central opening 56 to oil flow therethrough, and the valve annulus 62 is pressed upwardly against its seat, thus normally also closing the openings 58 of the circular series thereof to any flow therethrough.

However, the described arrangement is further one providing that if the pressure of oil entering the filter through the head passage 16 and thus normally flowing downwardly through the center tube 24 and radially outwardly through the filter medium 32 (as indicated by the full-line arrows, FIG. 1) builds up beyond the pressure at which the valve unit is set to operate (say 15 lbs. per sq. in.) which is determined by the prebias applied to the spring 64, the valve annulus 62 will lower from its seat, thus permitting oil to bypass the filter medium and instead to flow downwardly from center tube through the openings 58 of the circular series thereof controlled by said valve annulus, thence out to the filter bowl through the end-cap nipple 48, and thence up the bowl inner wall and out the head passage 18. Conversely, if the pressure of oil entering the filter through the head passage 18 and thence normally flowing downwardly through the annular space between bowl wall and filter element and thence radially inwardly through said filter medium 32 (as indicated by the broken-line arrows, FIG. 2) builds up beyond that at which said valve unit is set to operate as aforesaid, the valve disc 60 will be raised from its seat, as permits oil to again bypass the filter and instead to flow upwardly through the center tube 22 and back to the oil line through head passage 16 now acting as an outlet passage.

From the above description and consideration of the drawings, it will readily be seen that a filter element incorporating a two-way bypass valve according to the invention enables the filter in which said element is installed to operate either as an inside-out flow filter or as an outside-in flow filter, thus solving the problem of the likelihood of the filter element bursting under the high pressures developing therein under the circumstance of the filter being incorrectly hooked into the oil line and the filter medium becoming fouled or contaminated to the degree making normal oil flow therethrough impossible. It will also be appreciated by those skilled in the oil filter field that a two-way bypass valve unit of the invention may be readily and economically manufactured as a complete subassembly unit ready for assembly as such, not only in new but also in existing filters; that such assembly may be readily effected by a simple press-fitting of the unit in the lower end of the center tube of the filter (such of course assuming that the filter is not of the type employing a center bolt to secure the filter bowl to head or base casting); and that the unit is dependable and foolproof in its operation.

As many changes could be made in carrying out the above constructions without departing from the scope of the invention, it is intended that all matter contained in the above description or shown in the accompanying drawing shall be interpreted as illustrative and not in a limiting sense.

I claim:

1. An oil filter comprising, in combination, a filter bowl, a closure member having oil-flow passages therein opening to and from the bowl interior, and a filter element operatively mounted in the bowl in the normal path of oil flow between said passages and including a perforated-wall center tube and an annular body of filtering media extending thereabout, and a two-way bypass valve unit mounted in fixed position within and at one end of said center tube and thus in the path of oil flowing in either axial direction therethrough and being operative to permit oil entering the bowl through either one of said passages and leaving through the other passage to bypass the filtering media of the filter element upon the pressure of oil within the bowl exceeding a predetermined safe pressure, said unit comprising a cup-shaped shell having a press fit in said center tube the end wall of said shell having centrally disposed and at least one radially-inwardly disposed oil-flow through openings, a valve disc normally seating on the relatively under face of said end wall and adapted to close only said centrally disposed opening, a valve annulus normally seating against the relatively inner face of said end wall and adapted to close only said radially-outwardly disposed opening, and means serving simultaneously to bias both said valve disc and valve annulus to their respective seated positions while permitting movement of either but not both to an unseated position as permits oil flow through either but not both said central opening and said radially-outwardly disposed opening, said biasing means comprising a cross strap member extending diameter-wise across the interior of said shell and having slide fit on the sidewall surface thereof, said valve disc and cross strap member being loosely connected by a pin extending axially through said central opening, and a coil spring interposed between and reactive against said valve annulus and the cross strap member and imparting spring bias in seating direction on said valve disc via said member and pin and further imparting spring bias in seating direction on said valve annulus by its direct engagement therewith, the construction and arrangement of said two-way bypass valve unit being thus such as makes immaterial which of said oil-flow passages in said bowl closure member provides the oil inlet passage to the bowl interior and which the oil outlet passage therefrom.

2. An oil filter element comprising spaced inner and outer annular perforated-wall screen members, and caps permanently affixed to the opposite ends of said screen member, a pleated-paper filter media contained within the annular space between said screen members and being edge-sealed to the inner surfaces of said end caps, and a two-way bypass valve unit mounted in fixed position in and at one end of said inner tubular screen member and including a cup-shaped shell having press fit in said inner screen member, the end wall of said shell having a centrally disposed and at least one radially-outwardly disposed through opening therein, a valve disc normally seating on the relatively under face of said shell end wall and adapted to close only said central opening, a valve annulus normally seating against the relatively inner face of said end wall and adapted to close only the radially-outwardly disposed opening, and means serving simultaneously to bias both said valve disc and valve annulus to their respective seated positions while permitting movement of either but not both to an unseated position, said biasing means comprising a cross strap member extending diameter-wise across the interior of said shell and having slide fit on the sidewall surface thereof, said valve disc and cross strap member being loosely connected by a pin extending axially through said central opening and said valve annulus, and a coil spring interposed between and reactive against the valve annulus and said cross strap member, said spring imparting spring bias in seating direction on said disc valve via said member and pin and further imparting spring bias in seating direction on said valve annulus by its direct engagement therewith, the construction and arrangement being such that said valve unit is operative to permit oil which would normally be filtered by its passage through said filter media in either direction to bypass same upon the pressure of said oil exceeding a predetermined safe pressure.

3. A full-flow oil filter comprising: an open top, generally cylindrical filter bowl and a head member affixed in top-closing relation to the bowl and having oil-inlet and oil-outflow passages provided therein, of which one said passage terminates at its relatively inner end in a passage portion which opens to the bowl interior on the bowl axis and the other said passages terminates at its relatively inner end in a passage portion which also opens to the bowl interior but is disposed radially-outwardly from said bowl axis; an annular filter element disposed in said closed-top bowl comprising inner and outer tubular screens, imperforate end caps affixed to the opposite ends of said screens and oil filtering media filling the annular space between said screens; means mounting said filter element in coaxial relation within the filter bowl and including means forming a sealed oil-flow path extending between said axial passage portion and the proximal end of the inner tubular screen of the filter element whereas said other passage portion is at all times in full open communication with the interior space of the filter bowl extending about and to the ends of said filter element; and a two-way bypass valve unit mounted within said inner tubular screen at its distal end and being operative when the pressure of the oil is within safe limits positively to close off said distal end to oil flow therethrough in either direction; whereby oil entering the filter through said axial passage portion then operating as the filter oil-inlet is constrained to flow directly to said proximal end of and thence axially along said inner screen and thence radially-outwardly through the filtering media to said other passage portion, and whereby oil entering the filter through said other passage portion then operating as the filter oil-inlet is constrained to flow radially-inwardly through said filtering media and thence outwardly from the filter through said inner screen and said axial passage portion; and said bypass valve unit being further operative, upon a buildup of the pressure of the oil entering the filter through said axial passage portion beyond a predetermined safe limit, to open said distal end of the inner screen to oil flow therethrough in one direction as results in said oil bypassing the filtering medium and following a flow path extending directly to said other passage portion and, conversely, upon the pressure of the oil entering the filter through said other passage portion building up beyond the predetermined safe limit, to open said distal end of the inner screen to oil flow therethrough in the opposite direction as results in said oil bypassing the filtering medium and following an outflow path from the filter interior defined by the bore of said inner screen and said axial passage portion.

4. A full-flow oil filter according to claim 3, wherein said two-way bypass valve unit includes a generally circular wall member extending transversely across the bore of said inner tubular screen and in the path of oil flow in either direction therethrough, said wall member having centrally disposed and at least one radially-outwardly disposed oil-flow through openings, separate valve elements seating against the opposite faces of said circular wall, of which one said element is adapted to close only said central opening and the other element is adapted to close only said radially-outwardly disposed opening, and spring means common to the said valve elements serving to bias both said elements to their respective seated positions while permitting movement of either, but not both simultaneously, to an unseated position, as permits oil flow through either, but not both simultaneously, said central opening or said radially-outwardly disposed opening.

5. A full-flow oil filter according to claim 3, wherein said two-way bypass valve unit comprises an inverted cup-shaped shell having its sidewall affixed to the inner surface of said inner screen, the end wall of said shell having a centrally disposed and at least one radially-outwardly disposed through openings therein, a valve disc disposed to seat on the relatively under face of the shell and endwall and adapted when seated to close said central opening, a valve annulus disposed to seat on the relatively inner face of said shell endwall and adapted when seated to close the radially-outwardly disposed opening, and means common to both said valve disc and valve annulus for biasing same simultaneously to their respective seated positions, while permitting movement of either, but not both simultaneously, to its unseated position.